(12) United States Patent
Högnelid et al.

(10) Patent No.: US 10,332,221 B2
(45) Date of Patent: Jun. 25, 2019

(54) SYSTEM AND METHOD FOR CONTROLLING THE END-USAGE OF A NETWORK DISTRIBUTED UTILITY

(71) Applicant: PERIFIC TECHNOLOGIES AB, Kista (SE)

(72) Inventors: Kurt Högnelid, Bromma (SE); Olle Magnusson, Stockholm (SE)

(73) Assignee: PERIFIC TECHNOLOGIES AB, Kista (SE)

( * ) Notice: Subject to any disclaimer, the term of this patent is extended or adjusted under 35 U.S.C. 154(b) by 204 days.

(21) Appl. No.: 15/527,414

(22) PCT Filed: Oct. 20, 2015

(86) PCT No.: PCT/EP2015/074247
§ 371 (c)(1),
(2) Date: May 17, 2017

(87) PCT Pub. No.: WO2016/083024
PCT Pub. Date: Feb. 6, 2016

(65) Prior Publication Data
US 2017/0337645 A1   Nov. 23, 2017

(30) Foreign Application Priority Data
Nov. 24, 2014 (SE) ...................................... 1451416

(51) Int. Cl.
*G06Q 50/06* (2012.01)
*H02J 3/14* (2006.01)
(Continued)

(52) U.S. Cl.
CPC ............. *G06Q 50/06* (2013.01); *G05B 15/02* (2013.01); *G06Q 10/06315* (2013.01);
(Continued)

(58) Field of Classification Search
None
See application file for complete search history.

(56) References Cited

U.S. PATENT DOCUMENTS

| 4,031,406 A | 6/1977 | Leyde et al. |
| 4,034,233 A | 7/1977 | Leyde |

(Continued)

FOREIGN PATENT DOCUMENTS

WO   2012047888 A2   4/2012

OTHER PUBLICATIONS

International Search Report for PCT/EP2015/074247 dated Jan. 19, 2016.
(Continued)

*Primary Examiner* — Jason Lin
(74) *Attorney, Agent, or Firm* — Moore & Van Allen PLLC; W. Kevin Ransom (57) ABSTRACT

A utility is distributed to a group of subscribers via a distribution network. At least one parameter reflecting an instantaneous overall consumption of the utility in the distribution network is measured repeatedly, and an amount of the utility delivered to each subscriber in the group is controlled in response thereto. It is checked whether the instantaneous overall consumption of the utility is within an acceptable interval. If it is below a lower threshold level, at least one load is controlled to increase its consumption of the utility according to a pre-defined scheme in proportion to a deviation of the instantaneous overall consumption of the utility from the lower threshold level. If it is above an upper threshold level, at least one load is controlled to decrease its consumption of the utility according to the pre-defined scheme in proportion to a deviation of the overall consumption of the utility from the upper threshold level.

17 Claims, 3 Drawing Sheets

(51) Int. Cl.
*H02J 3/24* (2006.01)
*G05B 15/02* (2006.01)
*G06Q 10/06* (2012.01)
*H02J 3/12* (2006.01)

(52) U.S. Cl.
CPC .................. *H02J 3/12* (2013.01); *H02J 3/14* (2013.01); *H02J 3/24* (2013.01); *Y02B 70/3225* (2013.01); *Y04S 20/222* (2013.01)

(56) References Cited

U.S. PATENT DOCUMENTS

| | | |
|---|---|---|
| 4,064,485 A | 12/1977 | Leyde |
| 4,125,782 A | 11/1978 | Pollnow, Jr. |
| 4,694,192 A | 9/1987 | Payne et al. |
| 5,543,667 A * | 8/1996 | Shavit ..................... H02J 3/14 307/39 |
| 7,830,037 B2 * | 11/2010 | Hirst ..................... H02J 3/14 307/35 |
| 2007/0198133 A1 * | 8/2007 | Hirst ..................... H02J 3/14 700/295 |
| 2008/0097656 A1 * | 4/2008 | Desai ..................... G06F 1/28 700/295 |
| 2009/0105888 A1 | 4/2009 | Flohr et al. |
| 2012/0101651 A1 | 4/2012 | Haynes |
| 2012/0209438 A1 * | 8/2012 | Cruickshank, III ... G06Q 10/00 700/286 |
| 2013/0110621 A1 | 5/2013 | Gupta et al. |
| 2014/0327304 A1 * | 11/2014 | Markowz .................. H02J 3/00 307/11 |
| 2017/0316349 A1 * | 11/2017 | Cruickshank, III ... G06Q 10/00 |

OTHER PUBLICATIONS

Written Opinion of the International Searching Authority for PCT/EP2015/074247 dated Jan. 19, 2016.

\* cited by examiner

SYSTEM AND METHOD FOR CONTROLLING THE END-USAGE OF A NETWORK DISTRIBUTED UTILITY

CROSS-REFERENCE TO RELATED APPLICATION(S)

This application is a national stage application (filed under 35 § U.S.C. 371) of PCT/EP2015/074247, filed Oct. 20, 2015 of the same title, which, in turn claims priority to Swedish Application No. 1451416-0 filed Nov. 24, 2014 of the same title; the contents of each of which are hereby incorporated by reference.

FIELD OF THE INVENTION

The present invention relates to solutions for distributing a utility, e.g. electricity, natural gas or water, to subscribers via a distribution network.

Today, there is an ever increasing demand for public utilities, especially in the form of electric power. Moreover, the subscribers' demand for these utilities varies substantially over time—both within the 24-hour cycle, and over longer periods, such as between workdays and holidays, and with respect to seasonal changes. This poses major challenges for the produces as well as for the network operators. The demand variations, as such, are complicated to handle; and if the network is almost overloaded, the variations may cause a collapse of the network.

US 2013/0110621 shows a solution for creating appliance signatures based upon whole house composite load profiles. Here, primitive elements are identified including transients and absolute steady state levels. Then, the primitive elements are clustered along multiple dimensions to form impulses. The impulses are combined to form simple bundles, which, in turn, are combined with each other or impulses to form complex bundles. Specific appliance signatures are determined that substantially match the complex bundles. Moreover, transitions may be determined within the whole house composite load profile. Household specific appliance state machines can also be determined for each appliance in the household; and the whole house composite load profile can be disaggregated into individual appliance energy loads by assigning the determined transitions to the determined household specific appliance state machines.

US 2012/0101651 describes a method of demand response utilizing a Load Control Transponder (LCT) installed at the location of an electricity consumer. A demand response program, in conjunction with the LCT, allows a consumer to determine, in advance, when they will reduce their demand on an electricity supply system. The consumer is informed of price points at which the cost of energy increases due to overall demand. The consumer then determines if, and when, they will reduce their demand on the system when a price point is reached. In addition, when an unplanned, critical event occurs, the method enables the utility to bypass any intermediate consumer established settings and immediately and directly drop the level of energy consumption to the consumer's lowest selected level for continuing service thereby to shed sufficient load on the system to maintain an adequate level of electricity supply. Once the event has been resolved, the method enables the utility to restore the consumer's previous level of usage.

WO 2012/047888 discloses method of dynamically controlling a small-scale electrical load receiving energy from an electricity grid that includes sources of renewable generation causing variations in electricity supply of the electricity grid. The small-scale electrical loads are coupled to a load-matching thermostat having a communication module and a controller that manage electricity load to electrical supply for the electrical load.

Consequently, a solution is known for identifying individual loads within a household. There is also a method that enables subscribers to manually adapt their energy usage to reduce cost. Further, the prior art includes one solution for automatically controlling an electric load in response to the variations in a secondary parameter, namely ambient temperature. However, there is yet no automatic solution capable of reacting fast enough to handle the quick demand fluctuations in today's large-scale utility networks, e.g. the power grids for distributing electric energy.

SUMMARY OF THE INVENTION

The object of the present invention is therefore to solve the above problem, and thus offer a reliable and cost-efficient delivery of a utility to a large number of subscribers even though the demand as well the as supply may vary substantially over time.

According to one aspect of the invention, the object is achieved by the initially described system, wherein the at least one utility-usage-related parameter reflects an instantaneous overall consumption of the utility in the distribution network. The control unit is further configured to check whether the instantaneous overall consumption of the utility is within an acceptable interval. If the instantaneous overall consumption of the utility is found to be below a lower threshold level of the acceptable interval, the control unit is configured to control at least one load to increase its consumption of the utility according to a pre-defined scheme in proportion to a deviation of the instantaneous overall consumption of the utility from the lower threshold level. Conversely, if the instantaneous overall consumption of the utility is found to exceed an upper threshold level of the acceptable interval, the control unit is configured to control at least one load to decrease its consumption of the utility according to the pre-defined scheme in proportion to a deviation of the instantaneous overall consumption of the utility from the upper threshold level.

This system is advantageous because it enable short response time and quick adaption to any variations in the demand and/or supply of the utility, such as electric power, natural gas or water. This is especially true if the measurement of the instantaneous consumption of the utility is updated relatively often, say once every two seconds, or at least around once per minute. Moreover, the proposed central control of increases in the consumption of certain loads in the network renders it possible to anticipate future demand peaks, and partially advance the expected consumption to earlier points in time when the network is less loaded. By for example activating radiant heating floor or water heaters prematurely these units can accumulate energy in an alternative form, and thus their future demand for the utility can be temporarily cancelled, or at least be substantially reduced. Of course, however, according to the invention, if one does not desire any such central activation of the subscribers' loads, the lower threshold level can simply be set to zero.

According to one preferred embodiment of this aspect of the invention, if, however, the instantaneous overall consumption of the utility is within the acceptable interval, the control unit is configured to refrain from controlling any subscribers to increase or decrease their consumption of the utility until a next updating when it is checked whether the instantaneous overall consumption of the utility is within an acceptable interval. Thus, unnecessary control of the subscribers' loads is avoided.

According to another preferred embodiment of this aspect of the invention, the at least one usage-related parameter reflecting the instantaneous overall consumption of the utility is based on measurements of the consumption of individual subscribers in the group of subscribers. Thereby, a highly relevant measure is attained even if only a portion of the subscribers in the network are included. For instance, the control unit may be configured to repeatedly determine the instantaneous overall consumption of the utility based upon measurements of the consumption of the utility in a sub-group, say 5 to 25%, of the subscribers whose consumption of the utility the control unit is configured to control. Naturally, this drastically reduces the amount of data necessary to feedback from the subscribers to the control unit.

According to yet another preferred embodiment of this aspect of the invention, the pre-defined scheme specifies an order in which at least one utility-consuming load of each subscriber in the group of subscribers is to be activated and deactivated respectively. Namely, by applying such a structured scheme, it is possible to distribute the flow of the utility relatively smoothly. It can also be ensured that the subscribers are treated in a fair manner with regard to the supply of the utility. Preferably, the order of the pre-defined scheme represents a round robin algorithm, which specifically aims at allocating the utility in an equalizing manner with respect to loads of different subscribers when the at least one load is controlled to increase its consumption the utility. Analogously, when the at least one load is controlled to decrease its consumption the utility, the utility is withdrawn in an equalizing manner from loads of different subscribers.

According to another aspect of the invention, the object is achieved by the method described initially, wherein the at least one utility-usage-related parameter reflects an instantaneous overall consumption of the utility in the distribution network. Furthermore, the method involves checking whether the instantaneous overall consumption of the utility is within an acceptable interval. If the instantaneous overall consumption of the utility is found to be below a lower threshold level of the acceptable interval, the method involves controlling at least one load to increase its consumption of the utility according to a pre-defined scheme in proportion to a deviation of the instantaneous overall consumption of the utility from the lower threshold level. Conversely, if it is found that the instantaneous overall consumption of the utility exceeds an upper threshold level of the acceptable interval, the method involves controlling at least one load to decrease its consumption of the utility according to the pre-defined scheme in proportion to a deviation of the instantaneous overall consumption of the utility from the upper threshold level. The advantages of this method, as well as the preferred embodiments thereof, are apparent from the discussion above with reference to the proposed system.

According to a further aspect of the invention the object is achieved by a computer program product, which is loadable into the memory of a computer, and includes software for performing the steps of the above proposed method when executed on a computer.

According to another aspect of the invention the object is achieved by a computer readable medium, having a program recorded thereon, where the program is make a computer perform the method proposed above when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION OF THE INVENTION

Figure 1:
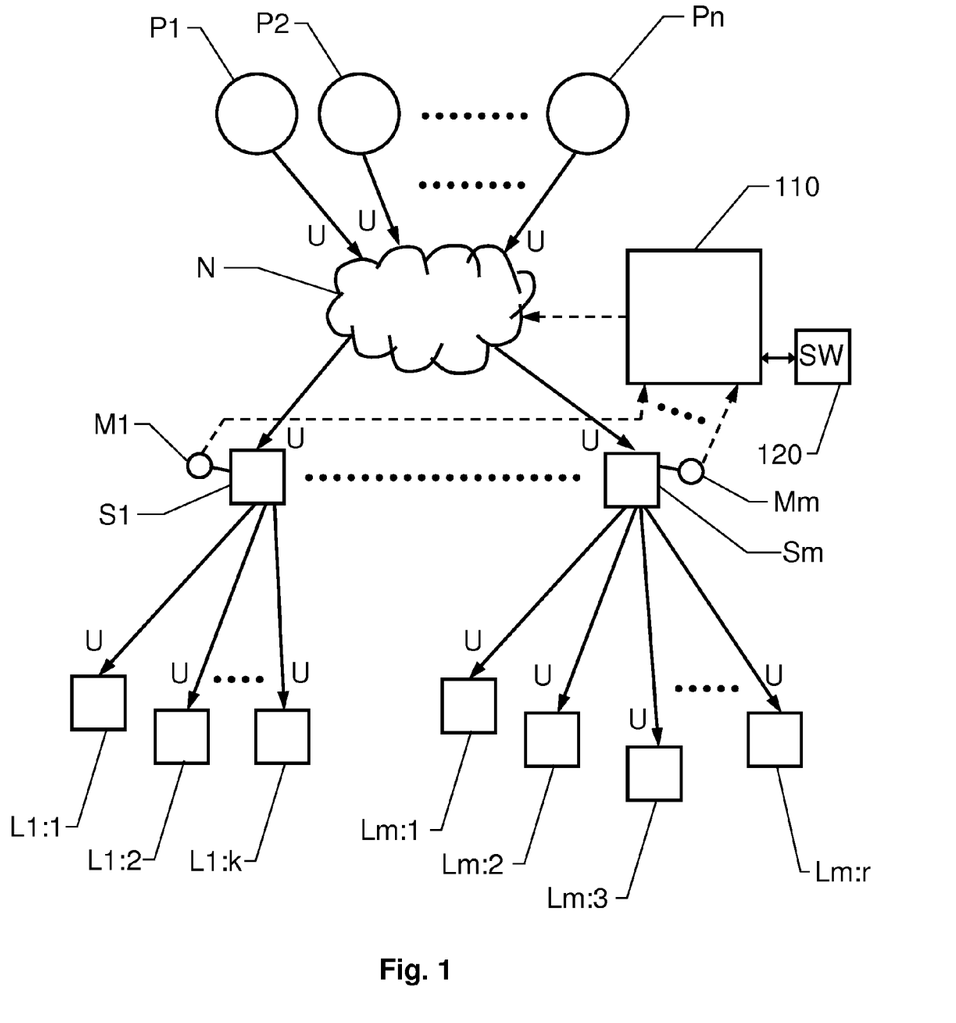
FIG. 1 shows a block diagram over a system according to an embodiment of the invention.
Figure 2:
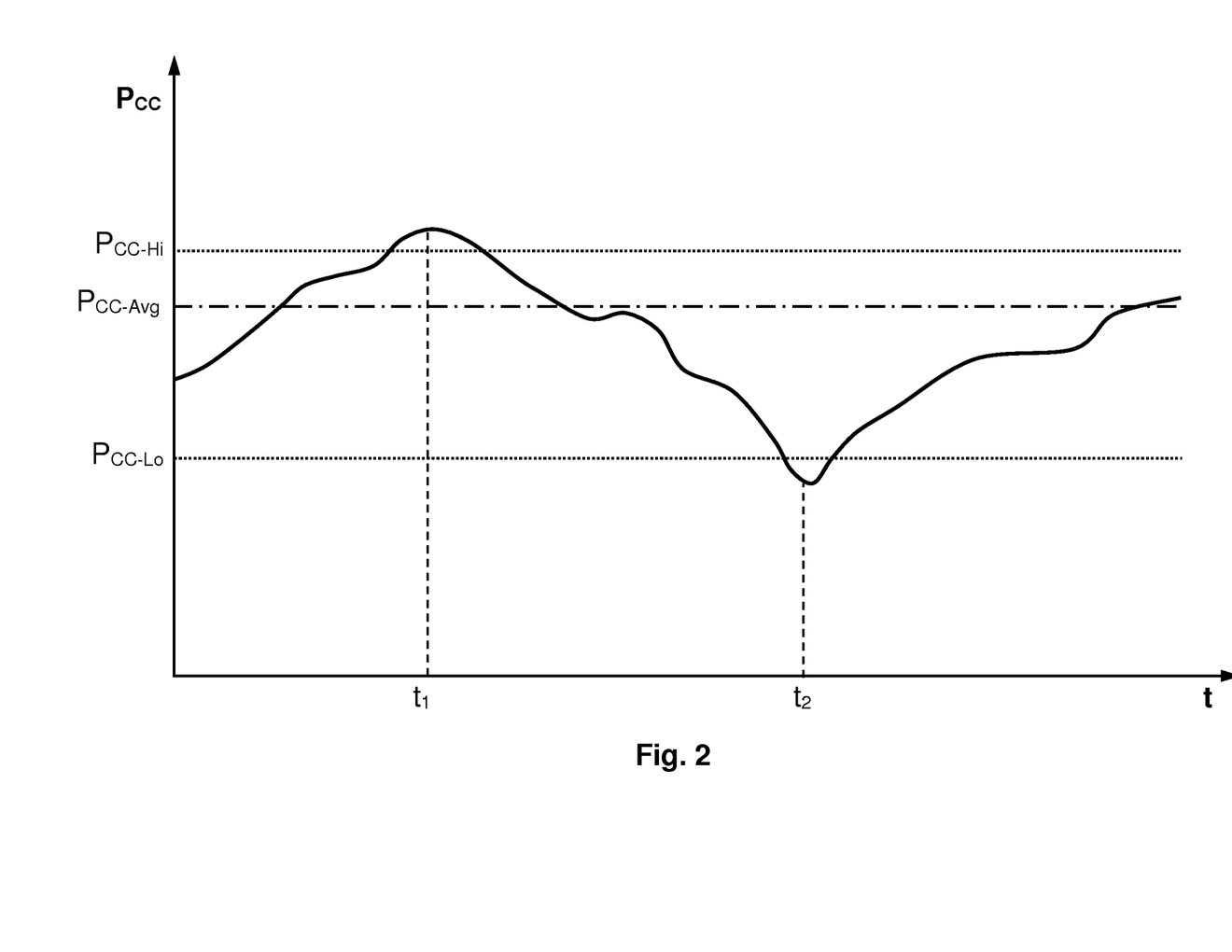
FIG. 2 shows a graph exemplifying how the instantaneous consumption of a utility may vary over time, and be controlled according to the invention.

Initially, we refer to FIGS. 1 and 2, where the former shows a block diagram over a system according to an embodiment of the invention for distributing a utility U, e.g. electric power, to a group of subscribers S1, . . . , Sm via a distribution network N. FIG. 2 shows a graph exemplifying how the instantaneous consumption of a utility $P_{CC}$ may vary over time tin response to control according to the invention.

Besides the subscribers S1, . . . , Sm, the system includes at least one sensor M1, . . . , Mm and a control unit 110. Each of the at least one sensor M1, . . . , Mm is configured to measure, repeatedly, a respective utility-usage-related parameter $P_{CC}$, for example an instantaneous consumption at a particular subscriber. Preferably, the at least one sensor M1, . . . , Mm is further configured to perform so-called disaggregation of the respective subscribers' S1, . . . , Sm consumption of the utility U. This means that the sensor derives appliance signatures identifying individual loads within each subscriber's consumption. Naturally, such detailed information is very useful because it enables the control unit 110 to determine that a particular subscriber has activated a relatively non-critical load, e.g. a radiant heating floor, and if also the instantaneous overall consumption is found to reach a critically high level, the control unit 110 may specifically control that load to decrease its consumption, or even be deactivated. This procedure will be described in further detail below.

The control unit 110 is configured to control an amount of the utility U being delivered to each subscriber S1, . . . , Sm in the group of subscribers in response to the measured at least one utility-usage-related parameter $P_{CC}$.

According to the invention, the at least one utility-usage-related parameter $P_{CC}$ specifically reflects an instantaneous overall consumption of the utility U in the distribution network N. Thus, the at least one usage-related parameter $P_{CC}$ reflecting the instantaneous overall consumption of the utility U may be based on measurements registered by the sensors M1, . . . , Mm of the consumption of individual subscribers in the group of subscribers.

The control unit 110 is configured to check whether the instantaneous overall consumption of the utility U is within an acceptable interval. In the graph of FIG. 2, this interval is exemplified as $P_{CC-Lo} < P_{CC} < P_{CC-Hi}$. The interval may be symmetric around a 24-hour average value $P_{CC-Avg}$ for overall consumption of the utility U, i.e. $P_{CC-Lo} = P_{CC-Avg} -$ an allowed variation, and $P_{CC-Lo} = P_{CC-Avg} +$ an allowed variation. However, preferably, the interval is non-symmetrical with respect to the 24-hour average value $P_{CC\text{-}Avg}$. In any case, the threshold levels $P_{CC\text{-}Lo}$ and $P_{CC\text{-}Hi}$ are always set such that the 24-hour average value $P_{CC\text{-}Avg}$ lies within the interval. It should be noted that, for statistical reasons, the group subscribers whose consumption of the utility U is being can be smaller than the group subscribers whose consumption of the utility U is controlled from the control unit 110. For example, given a statistically representative selection, it may be sufficient if the consumption of 5 to 25% the subscribers being controlled is measured.

In any case, if the control unit 110 finds that the instantaneous overall consumption of the utility U is below the lower threshold level $P_{CC\text{-}Lo}$ of the acceptable interval, the control unit 110 controls at least one load L1:1, L1:2, L1:k, Lm:1, Lm:2, Lm:3, and/or Lm:r of the subscribers S1, ... , Sm to increase its consumption of the utility U according to a pre-defined scheme in proportion to a deviation of the instantaneous overall consumption $P_{CC}$ of the utility U from the lower threshold level $P_{CC\text{-}Lo}$. Here, for example, the consumption of the utility U may be controlled to increase: $(P_{CC\text{-}Avg}-P_{CC})/(P_{CC\text{-}Avg}-P_{CC\text{-}Lo})$ %. As mentioned above, the lower threshold level $P_{CC\text{-}Lo}$ may very well be set to zero. This means that none of the at least one load L1:1, L1:2, L1:k, Lm:1, Lm:2, Lm:3, and/or Lm:r will ever be controlled by the control unit 110 to activated, or by other means be influenced to increase its consumption of the utility U.

If the control unit 110 finds that the instantaneous overall consumption of the utility U is above an upper threshold level $P_{CC\text{-}Hi}$ of the acceptable interval, control at least one load L1:1, L1:2, L1:k, Lm:1, Lm:2, Lm:3 and/or Lm:r to decrease its consumption of the utility U according to the pre-defined scheme in proportion to a deviation of the instantaneous overall consumption $P_{CC}$ of the utility U from the upper threshold level $P_{CC\text{-}Hi}$. Here, for example, the consumption of the utility U may be controlled to decrease: $(P_{CC}-P_{CC\text{-}Avg})/(P_{CC\text{-}Hi}-P_{CC\text{-}Avg})$ Nevertheless, if the control unit 110 finds that the instantaneous overall consumption $P_{CC}$ of the utility U is within the acceptable interval $P_{CC\text{-}Lo}$ to $P_{CC\text{-}Hi}$, the control unit 110 preferably refrains from controlling any of the subscribers S1, ... , Sm to increase or decrease their consumption of the utility U, at least until a next update of the checking whether the instantaneous overall consumption of the utility U is within the acceptable interval.

In the example of FIG. 2, we assume that the instantaneous overall consumption $P_{CC}$ of the utility U exceeds the upper threshold level $P_{CC\text{-}Hi}$. This is discovered by an updating of the measurement made by the control unit 110 at a first point in time $t_1$. The control unit 110 therefore orders loads in the network N to decrease their consumption of the utility U; and, as a result, the instantaneous overall consumption $P_{CC}$ of the utility U is gradually lowered. Then, at a second point in time $t_2$, the control unit 110 detects that the instantaneous overall consumption $P_{CC}$ of the utility U has fallen below the lower threshold level $P_{CC\text{-}Lo}$. Consequently, the control unit 110 orders loads in the network N to increase their consumption of the utility U, and shortly the instantaneous overall consumption $P_{CC}$ rises again. Hence, the demand fluctuations in the network N can be kept reasonable.

The pre-defined scheme specifies an order in which at least one utility-consuming load L1:1, L1:2, L1:k, Lm:1, Lm:2, Lm:3 and/or Lm:r of the subscribers S1, ... , Sm is to be activated and deactivated respectively. For instance, the order of the pre-defined scheme may represent a round robin algorithm aiming at allocating the utility U in an equalizing manner to loads (L1:1, L1:2, L1:k, Lm:1, Lm:2, Lm:3 and/or Lm:r of different subscribers S1, ... , Sm when the at least one load is controlled to increase its consumption the utility U. Analogously, the algorithm of the pre-defined scheme may involve withdrawing the utility U in an equalizing manner from loads L1:1, L1:2, L1:k, Lm:1, Lm:2, Lm:3 and/or Lm:r of different subscribers S1, ... , Sm when the at least one load is controlled to decrease its consumption the utility U.

According to the invention, it is not required that all subscribers of the network N are controllable from the control unit 110. On the contrary, the solution may indeed operate well also if the network contains a number of subscribers in addition to the group of subscribers S1, ... , Sm to which the amount of the utility U delivered is repeatedly controlled by the control unit 110.

In any case, the control unit 110 preferably contains, or is in communicative connection with a memory unit 120 storing a computer program product SW, which contains software for making the control unit 110 execute the above-described actions when the computer program product SW is run on the control unit 110.

Figure 3:
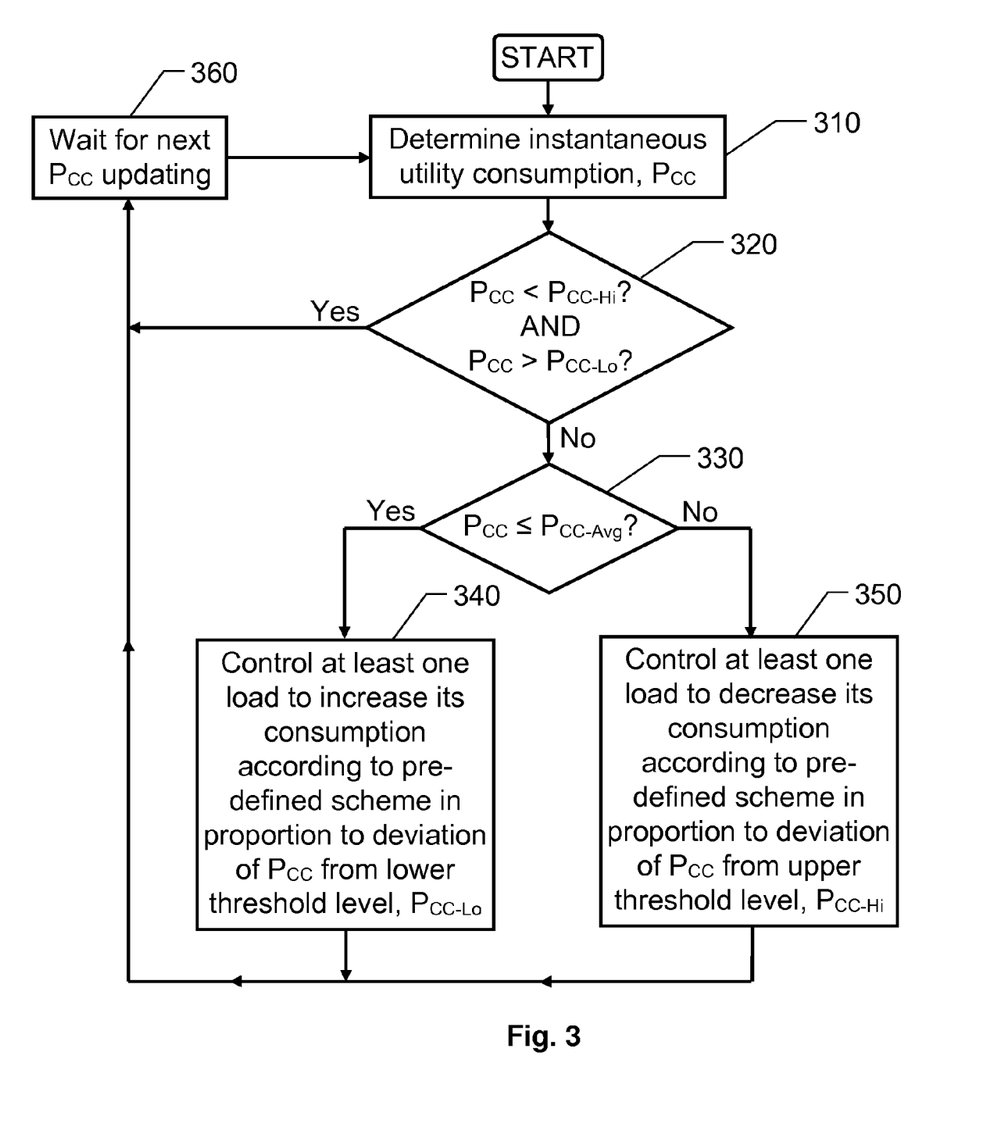
FIG. 3 illustrates, by means of a flow diagram, the general method according to the invention for controlling the distribution of a utility over a network.

In order to sum up, and with reference to the flow diagram in FIG. 3, we will now describe the general method executed in the control unit 110 according to the invention in order to distribute a utility to a group of subscribers via a distribution network.

In a first step 310, an instantaneous utility consumption is determined, preferably by compiling measurements of the individual consumptions of the group of subscribers (or a subset thereof) in the distribution network.

Thereafter, a step 320 checks whether the instantaneous overall consumption of the utility is within an acceptable interval. In other words, in step 320, it is investigated if the instantaneous overall consumption $P_{CC}$ of the utility is above a lower threshold level $P_{CC\text{-}Lo}$ of the acceptable interval; and at the same time, below an upper threshold level $P_{CC\text{-}Hi}$ of the acceptable interval.

A subsequent step 330 checks if the instantaneous overall consumption $P_{CC}$ of the utility is below a 24-hour average value $P_{CC\text{-}Avg}$ for overall consumption of the utility. The lower and upper threshold levels $P_{CC\text{-}Lo}$ and $P_{CC\text{-}Hi}$ respectively of the acceptable interval are further presumed to be set such that the 24-hour average value $P_{CC\text{-}Avg}$ is always within the acceptable interval. Consequently, if the check in step 330 is answered in the negative, this means that the instantaneous overall consumption $P_{CC}$ of the utility is also below the lower threshold level $P_{CC\text{-}Lo}$. Analogously, if the check in step 330 is answered in the positive, this means that the instantaneous overall consumption $F_{CC}$ of the utility also exceeds the upper threshold level $P_{CC\text{-}Hi}$.

If in step 330 it is found that the instantaneous overall consumption of the utility is below the lower threshold level $P_{CC\text{-}Lo}$ of the acceptable interval a step 340 follows. If, however, in step 330 it is found that the instantaneous overall consumption of the utility exceeds the upper threshold level $P_{CC\text{-}Hi}$ of the acceptable interval a step 350 follows.

In step 340 at least one load of at least one subscriber in the network is controlled to increase its consumption of the utility according to a pre-defined scheme in proportion to a deviation of the overall consumption of the utility from the lower threshold level $P_{CC\text{-}Lo}$. For example, the consumption of the utility may be controlled to increase: $(F_{CC\text{-}Avg}-P_{CC})/(P_{CC\text{-}Avg}-P_{CC\text{-}Lo})$ %.

In step 350 at least one load of at least one subscriber in the network is controlled to decrease its consumption of the utility according to a pre-defined scheme in proportion to a deviation of the overall consumption of the utility from the upper threshold level $P_{CC\text{-}Hi}$. For example, the consumption of the utility may be controlled to decrease: $(P_{CC}-P_{CC\text{-}Avg})/(P_{CC\text{-}Hi}-P_{CC\text{-}Avg})$ %.

After steps 340 and 350, a step 360 follows in which the procedure waits until it is time to update the measurement of the instantaneous overall consumption of the utility. Depending on the utility and the type of network, this delay may be anything from 2 seconds to a number of minutes. Then, the procedure continues to step 310 again.

All of the process steps, as well as any sub-sequence of steps, described with reference to FIG. 3 above may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for distributing a utility to a group of subscribers via a electric grid, the system comprising:
at least one sensor configured to measure, repeatedly, at least one utility-usage-related parameter; and
one or more processor configured to control an amount of the utility being delivered to each subscriber in the group of subscribers in response to the measured at least one utility-usage-related parameter, wherein the at least one utility-usage-related parameter reflects an instantaneous overall consumption of the utility in the electric grid, and the one or more processor is further configured to:
determining whether the instantaneous overall consumption of the utility is within an acceptable interval,
in response to determining the instantaneous overall consumption of the utility (41) is below a lower threshold level of the acceptable interval, control at least one load to increase its consumption of the utility according to a pre-defined scheme in proportion to a deviation of the overall consumption of the utility from the lower threshold level, and
in response to determining the instantaneous overall consumption of the utility is above an upper threshold level of the acceptable interval, control at least one load to decrease its consumption of the utility according to the pre-defined scheme in proportion to a deviation of the overall consumption of the utility from the upper threshold level.

2. The system according to claim 1, wherein if the instantaneous overall consumption of the utility is within the acceptable interval,
the one or more processor is configured to refrain from controlling any subscribers to increase or decrease their consumption of the utility until a next update of the checking whether the overall consumption of the utility is within an acceptable interval.

3. The system according to claim 1, wherein the at least one usage-related parameter reflecting the instantaneous overall consumption of the utility is based on measurements of the consumption of individual subscribers in the group of subscribers.

4. The system according to claim 3, wherein the one or more processor is configured to determine the instantaneous overall consumption of the utility based upon measurements of the consumption of the utility in a sub-group of the subscribers to which the one or more processor is configured to repeatedly control the consumption of the utility.

5. The system according to claim 1, wherein the pre-defined scheme specifies an order in which at least one utility-consuming load of each subscriber in the group of subscribers is to be activated and deactivated respectively.

6. The system according to claim 5, wherein the order of the pre-defined scheme represents a round robin algorithm aiming at:
allocating the utility in an equalizing manner to loads of different subscribers when the at least one load is controlled to increase its consumption of the utility, and
withdrawing the utility in an equalizing manner from loads of different subscribers when the at least one load is controlled to decrease its consumption of the utility.

7. The system according to claim 1, wherein the network is further connected to at least one subscriber in addition to the group of subscribers to which the amount of the utility delivered is repeatedly controlled.

8. The system according to claim 1, wherein the utility is one of: electric power, gas and water.

9. A method of distributing a utility to a group of subscribers via a electric grid, the method comprising:
measuring, repeatedly, at least one utility-usage-related parameter;
controlling an amount of the utility delivered to each subscriber in the group of subscribers in response to the measured at least one utility-usage-related parameter, wherein the at least one utility-usage-related parameter reflecting an instantaneous overall consumption of the utility in the electric grid;
determining whether the instantaneous overall consumption of the utility is within an acceptable interval;

in response to determining the instantaneous overall consumption of the utility is below a lower threshold level of the acceptable interval, controlling at least one load to increase its consumption of the utility according to a pre-defined scheme in proportion to a deviation of the instantaneous overall consumption of the utility from the lower threshold level; and in response to determining the instantaneous overall consumption of the utility is above an upper threshold level of the acceptable interval, controlling at least one load to decrease its consumption of the utility according to the predefined scheme in proportion to a deviation of the overall consumption of the utility from the upper threshold level.

10. The method according to claim 9, wherein if the instantaneous overall consumption of the utility is within the acceptable interval, the method comprising:

refraining from controlling any subscribers to increase or decrease their consumption of the utility until a next update of the checking whether the instantaneous overall consumption of the utility is within an acceptable interval.

11. The method according to claim 9, wherein the at least one usage-related parameter reflecting the instantaneous overall consumption of the utility is based on measurements of the consumption of individual subscribers in the group of subscribers.

12. The method according to claim 11, comprising determining the instantaneous overall consumption of the utility based upon measurements of the consumption of the utility in a sub-group of the subscribers to which the amount of the utility delivered is repeatedly controlled.

13. The method according to claim 9, wherein the pre-defined scheme specifies an order in which at least one utility-consuming load of each subscriber in the group of subscribers is to be activated and deactivated respectively.

14. The method according to claim 13, wherein the order of the pre-defined scheme represents a round robin algorithm aiming at:

allocating the utility in an equalizing manner to loads of different subscribers when the at least one load is controlled to increase its consumption of the utility; and withdrawing the utility in an equalizing manner from loads of different subscribers when the at least one load is controlled to decrease its consumption of the utility.

15. The method according to claim 9, wherein the network is further connected to at least one subscriber in addition to the group of subscribers to which the amount of the utility delivered is repeatedly controlled.

16. The method according to claim 9, wherein the utility is one of: electric power, gas and water.

17. A computer program product comprising program code stored in a non-transitory computer-readable medium readable by a computer, said computer program product used for distributing a utility to a group of subscribers via a electric grid, said computer program code comprising computer instructions to cause one or more computer processors to perform the operations of:

measuring, repeatedly, at least one utility-usage-related parameter; controlling an amount of the utility delivered to each subscriber in the group of subscribers in response to the measured at least one utility-usage-related parameter, wherein the at least one utility-usage-related parameter reflecting an instantaneous overall consumption of the utility in the electric grid;

determining whether the instantaneous overall consumption of the utility is within an acceptable interval;

in response to determining the instantaneous overall consumption of the utility is below a lower threshold level of the acceptable interval, controlling at least one load to increase its consumption of the utility according to a pre-defined scheme in proportion to a deviation of the instantaneous overall consumption of the utility from the lower threshold level; and in response to determining the instantaneous overall consumption of the utility is above an upper threshold level of the acceptable interval, controlling at least one load to decrease its consumption of the utility according to the pre-defined scheme in proportion to a deviation of the overall consumption of the utility from the upper threshold level.

* * * * *

UNITED STATES PATENT AND TRADEMARK OFFICE
CERTIFICATE OF CORRECTION

PATENT NO. : 10,332,221 B2  
APPLICATION NO. : 15/527414  
DATED : June 25, 2019  
INVENTOR(S) : Kurt Högnelid and Olle Magnusson Page 1 of 1

It is certified that error appears in the above-identified patent and that said Letters Patent is hereby corrected as shown below:

On the Title Page

Please change Item (87) to:  
PCT Pub. No.: WO2016/083024  
PCT Pub. Date: June 2, 2016

In the Claims

In Column 8, Claim 1, please change Line 4 to:  
sumption of the utility is below a lower threshold Signed and Sealed this  
Sixth Day of August, 2019

Andrei Iancu  
*Director of the United States Patent and Trademark Office*